June 3, 1930.   R. W. BAKER   1,761,033
MACHINE FOR REMOVING SURPLUS INSULATION FROM
THE ARMATURES OF DYNAMO ELECTRIC MACHINES
Filed Sept. 23, 1927   4 Sheets-Sheet 1

Inventor
Russell W. Baker
By Spencer Hardman & Fehr
his Attorneys

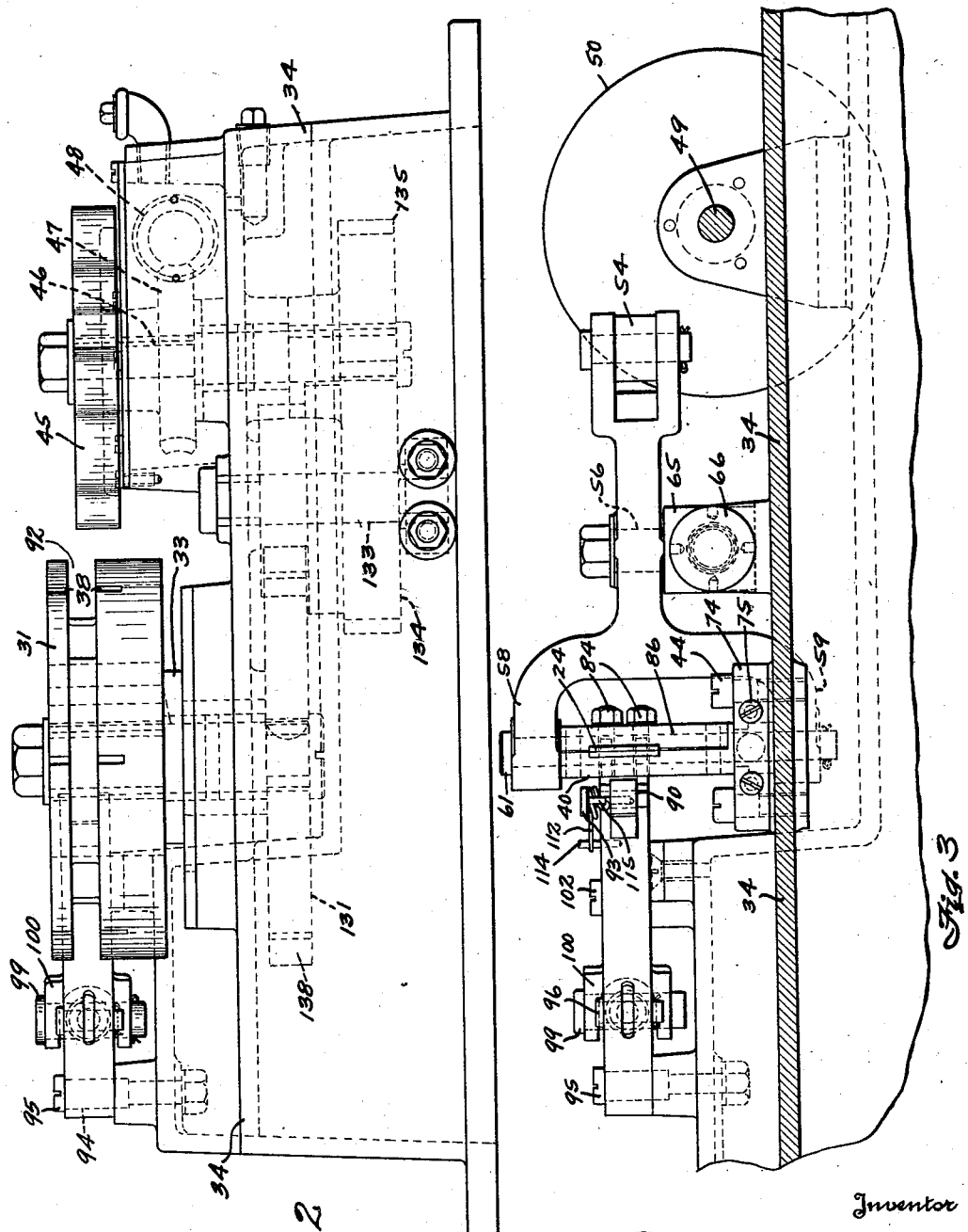

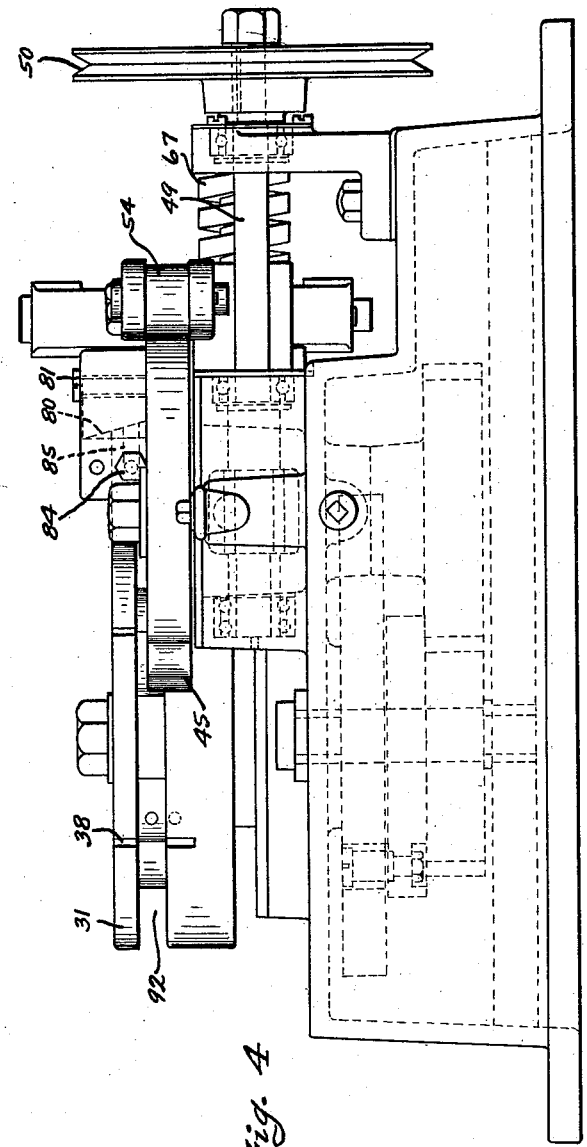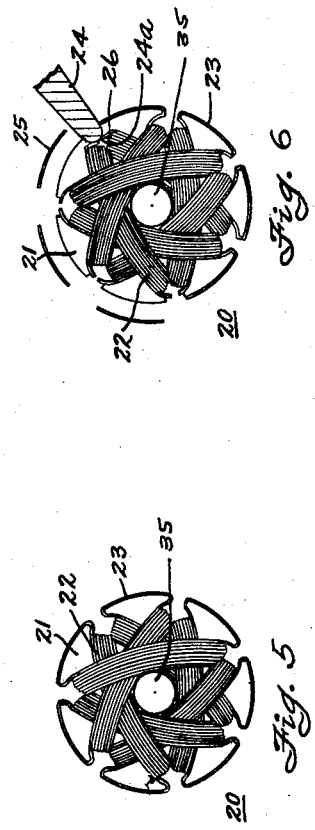

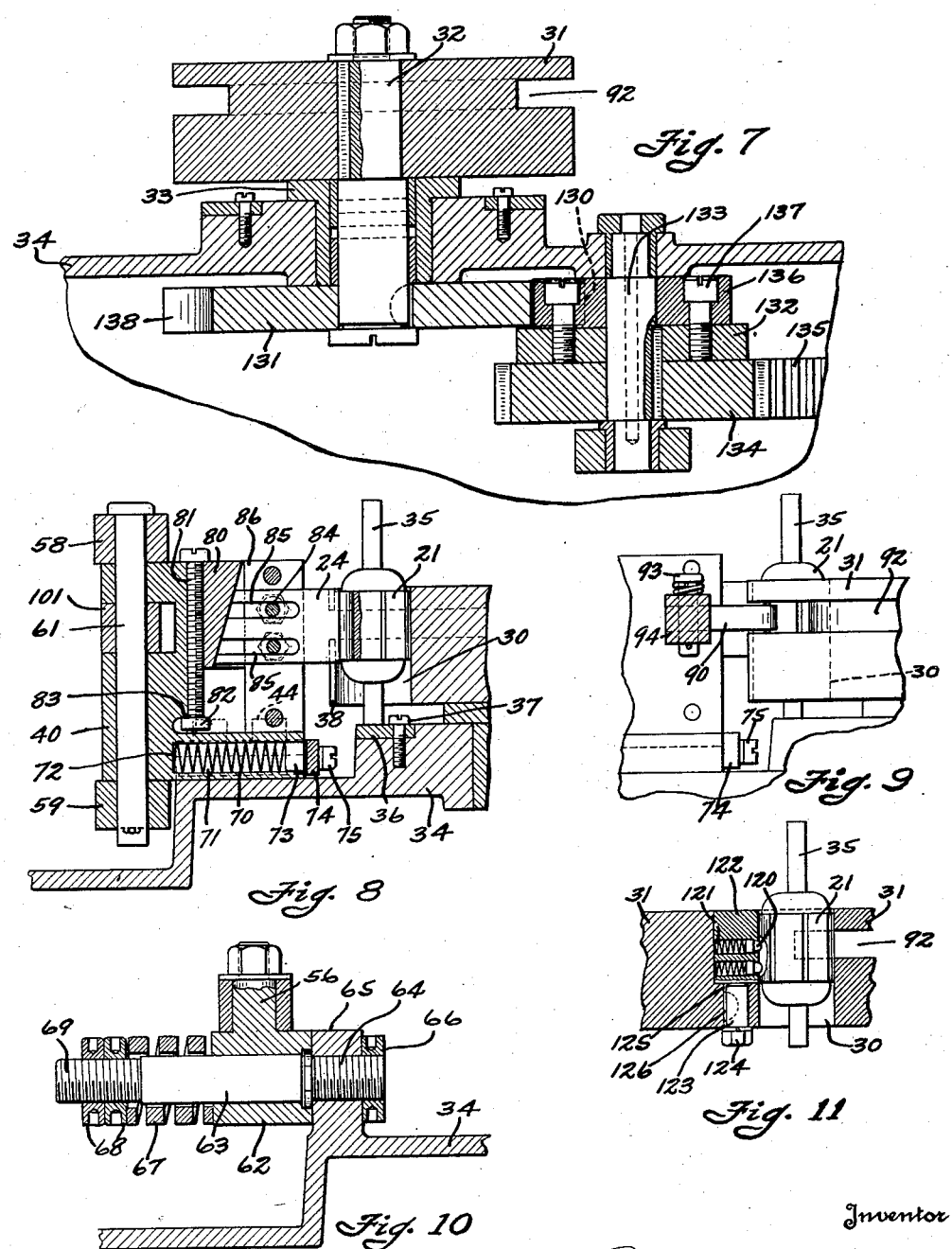

Patented June 3, 1930

1,761,033

UNITED STATES PATENT OFFICE

RUSSELL W. BAKER, OF ANDERSON, INDIANA, ASSIGNOR TO DELCO-REMY CORPORATION, OF DAYTON, OHIO, A CORPORATION OF DELAWARE

MACHINE FOR REMOVING SURPLUS INSULATION FROM THE ARMATURES OF DYNAMO-ELECTRIC MACHINES

Application filed September 23, 1927. Serial No. 221,511.

This invention relates to the manufacture of armatures for dynamo-electric-machines and more particularly to machines for manufacturing armatures, the core slots of which are lined with sheet insulation preparatory for winding or placing armature conductors upon the core.

One of the objects of the present invention is to provide an improved machine for operating upon the armature core after the armature windings have been placed thereon in order to remove from the core any surplus insulation not required for insulating the slots, that insulation which remains being retained within the slots by the armature windings.

Further objects and advantages of the present invention will be apparent from the following description, reference being had to the accompanying drawings, wherein a preferred form of embodiment of the present invention is clearly shown.

In the drawings:

Fig. 2 is a side view looking in the direction of the arrow 2 in Fig. 1.

Fig. 3 is a fragmentary sectional view taken principally on the line 3—3 of Fig. 1.

Fig. 4 is a side view in the direction of the arrow 4 in Fig. 1.

Fig. 5 is an end view of an armature before being operated upon by this machine.

Fig. 6 is a view similar to Fig. 5 showing the work done by this machine by its shearing member which is shown in section.

Figure 1:
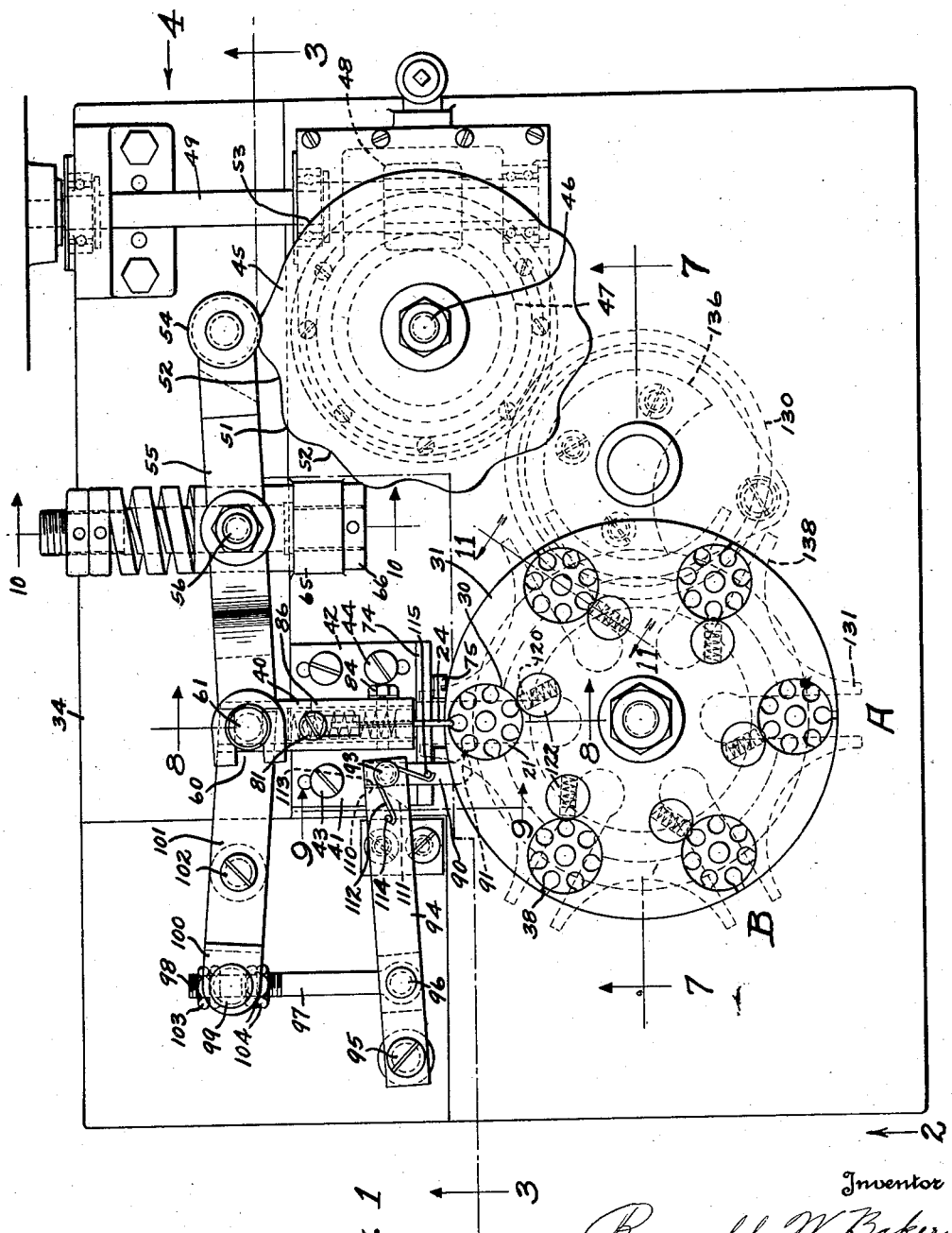
Fig. 1 is a plan view of a machine embodying the present invention.

Figs. 7 to 11 inclusive are cross sectional views taken, respectively, on the lines 7—7, 8—8, 9—9, 10—10 and 11—11.

Referring first to Figs. 5 and 6, numeral 20 designates an armature having a slotted core 21 which, preparatory to winding the conductors 22 thereon, has been wrapped with a strip of sheet insulation 23 in such a manner that the insulation lines the core slots and extends around the periphery of each core tooth. Those portions of the insulation which extend around the peripheries of the core teeth have no useful function in the completed armature but are merely incidental to the use of a single strip of sheet material for the insulation of the core slots instead of using individual pieces for lining the core slots. Such portions of insulation are surplus and must be removed before the armature can be used in a dynamo electric machine. Fig. 6 shows diagrammatically the manner in which the shearing element 24 of the machine cooperates with the core teeth to sever the surplus portions of insulation designated by numeral 25 from the slot lining portions designated by numeral 26.

The present machine comprises in the main an armature work holder, a shearing device cooperating with the core teeth to shear the surplus insulation from the slot lining insulation, means for automatically moving the armature core in order to bring its core teeth successively adjacent the shearing device, and means for automatically moving the work holder away from the shearing device after all parts of the surplus insulation have been severed, and for automatically moving another work holder containing an armature into position for operation upon the armature by the shearing device.

The work holder for each armature core is provided by recess 30 in a conveyor 31 for conveying a plurality of work holders toward and away from the shearing mechanism of the machine. The conveyor 31 is shown in the form of a rotary table which is keyed to a shaft 32 journaled in a bearing 33 which is supported by the machine frame 34. Each work holding recess 30 permits the rotation of the armature core 21 and its shaft 35 which rests at its lower end upon a plate 36 attached to the machine frame 34 by one or more screws 37. By mechanism to be described, the core 21 is intermittently rotated in order to bring its core slots successively into alignment with the shearing blade 24 which has been described in connection with Fig. 6. The table 31 is provided with a plurality of slots 38, each slot extending from the periphery of the table into the work holder recess 30 and providing for the movement into said recess of the shear blade 24. The blade 24 is supported for endwise movement radially of the conveyor table 31 by means including a blade supporting frame 40 which is guided by brackets 41 and 42 attached to the machine frame 34 by screws 43 and 44, respectively. The frame 40 is reciprocated relative to the table 31 by means including a cam 45 which is attached to a shaft 46 which is driven by worm gear 47 and a worm 48 connected with a power driven shaft 49 carrying a pulley 50 for receiving a belt, not shown, connected with a source of power. The cam 45 has a plurality of lobes 51 separated by relatively short valleys or wells 52 and a relatively long dwell 53. The cam 45 cooperates with a roller 54 to move a lever 55 fulcrumed upon a pin 56. The lever is bifurcated to provide yoke arms 58 and 59 having notched end 60 for receiving a pin 61 extending through the frame 40 as shown particularly in Fig. 8. The pin 56 is integral with a sleeve 62 slidably supported upon a stud 63 screwed at 64 into a lug 65 on the machine frame 34 and locked thereon by nut 66. A relatively stiff spring 67 is located between the sleeve 62 and adjustable nuts 68 threadedly connected with the threaded end 69 of the stud 63. This construction therefore provides a floating fulcrum for the lever 55. It is apparent therefore that whenever a lobe 51 of the cam 45 engages the roller 54 as shown in Fig. 1, the shear blade 24 will be moved through a slot 38 into a work holder recess 30 and between adjacent core teeth of an armature core 21 located in the recess 30. The width of the shear blade 24 has been so designed with relation to the width of the core slot at the peripheral edge of the core teeth that the blade cooperates with adjacent core teeth in order to shear the surplus insulation parts 25 from the parts of the insulation which line the core slots. The means for retracting the shear blade from the core slot and for causing the cam roller 54 to follow the cam 45 when a dwell or valley 52 is brought into alignment with the roller, comprises a spring 70 which is confined within a tubular recess 71 provided by the frame 40 and which presses against the frame at 72 and against a stud 73 attached to a bar 74 which is fastened to the guides 41 and 42 by screws 75. The shear blade 24 is shaped so that its entering edge 24ᵃ is somewhat rounded, and as the blade is ground away to keep it sharp this formation is retained by a special grinding wheel for this purpose. As the blade 24 is ground to keep it sharp, it must be adjusted relative to the frame 40 so that its shearing edge will extend the same distance from the frame. This adjustment is accomplished by a wedge 80 which is adjustable in a direction at right angles to the movement of the blade 24 by means of a screw 81 having its threads arranged to cooperate with a threaded groove in the wedge 80. In order to prevent the screw 81 from moving endwise when being turned to adjust the wedge, its lower end is permanently secured to a collar 82 which engages a stop 83 provided by the frame in order to prevent upward movement of the screw. Before turning the screw 81 to adjust the blade 24, it is necessary to loosen the two screws 84 which extend through slots 85 in the blade 24 for the purpose of supporting the blade and guiding it while it is being adjusted by the wedge. After adjusting the wedge in order to locate the shearing edge of the blade 24 correctly relative to the frame 40, the screws 84 are tightened in order to clamp the blade 24 between the frame 40 and a clamping bar 86.

The mechanism for indexing or turning the armature core into different positions so that all of the surplus insulation pieces may be severed from the slot lining insulation comprises a pawl 90 having a point 91 which extends into a groove 92 provided by the table 31 so that the point 91 may be permitted to move into each one of the core slots of an armature core and to rotate the core in a counterclockwise direction as viewed in Fig. 1. The pawl 90 is pivotally connected by a pin 93 with a lever 94 which is pivotally connected with the frame 34 by a pin or screw 95. The lever 94 carries a pin 96 passing through a link 97 having a threaded end 98 which passes through a pin 99 carried by the bifurcated end 100 of a lever 101. The lever 101 is pivotally supported upon the frame 34 by a screw 102 and is provided with an aperture for receiving the pin 61 as shown particularly in Fig. 8. The effective link of the link 97 or the distance of the pins 96 and 99 may be varied by adjusting the pairs of nuts 103 and 104 which cooperate with the threaded end 98 of the link 97 to vary the location of the pin 99 relative thereto. The free end of the lever 94 is recessed to receive the pawl 90 and one part of the recess provides a stop 110 for limiting movement of the pawl 90 in a counterclockwise direction. The pawl 90 however is free to swing a substantial amount in a clockwise direction since the recess has been relieved at 111 for this purpose. The pawl 90 is yieldingly urged by a spring 112 in a counterclockwise direction so that its end 113 shown in Fig. 1 tends to engage the stop 110. The intermediate portion of the spring 112 is coiled about the pin 93 and one end thereof engages a pin 114 carried by the lever 94 and a pin 115 carried by the pawl 90. As the lever 55 moves clockwise under the action of the spring 70 to retract the blade 24 from the armature core, the lever 94 will be moved clockwise about its pivot 95 in order to cause the pawl point 91 to push the core 21 in a counterclockwise direction an angular distance sufficient to bring the next core slot into alignment with the blade 24. This distance for example, will be 1/7 of 360 degrees since there are seven core slots in the armature. The core is retained yieldingly in its new position by a plurality of plungers 120 shown particularly in Fig. 11. These plungers are adapted to enter one of the core slots in order to locate the core correctly with respect to the slot 38 which is adjacent the shearing blade 24. The plungers 120 are slidable within recesses 121 provided by a plug 122 adapted to fit a hole of the same diameter provided in the table 31. Each plug 122 is provided with a shank 123 which has a threaded lower end cooperating with a nut 124 for the purpose of retaining the plug in position. The hole in the table 31 for receiving the shank 123 is provided with a key slot 125 for receiving a key 126 in order to fix the plug 122 in its correct relation to the work holder recess 30. It is apparent that as the core 21 is moved by the pawl 90 from a position as shown in Fig. 1, the plungers 120 will be moved out of a core slot and will be engaged by a core tooth until the next succeeding slot has arrived opposite these plungers and the plungers will spring into that slot in order to retain the core in its new position. As the blade 24 is moved toward the work, the lever 94 will be moved counterclockwise and its point willl drag along one of its core teeth until it arrives opposite its next succeeding core slot as shown in Fig. 1. Since the cam 45 has been provided with as many lobes 51 as there are armature core slots, seven being the number in the machine shown in the drawings, there will be seven reciprocations of the blade 24 alternated by seven indexing movements of the pawl 90. Therefore it is apparent that all of the surplus insulation parts 25 will be severed from the core lining insulation and that the work of the machine upon the armature core has been completed. It will be noted that the cam 45 performs the seven operations upon the roller 54 only during a little over half of its rotation and that the relatively long dwell 52 provides a substantial period of rest for the shearing and indexing mechanism during which period the shear blade 24 is retracted from the conveyor table 31. During this period of rest, the conveyor table is moved in a counterclockwise direction in order to bring another of its work holder recesses containing an armature to be operated upon, into alignment with the shear blade 24 and into cooperative relation with the indexing pawl 90. The mechanism for intermittently rotating the conveyor table 31 comprises a Geneva gear driving member 130 which cooperates with a Geneva gear driven member 131. The driving member 130 is carried by a plate 132 keyed to a shaft 133 which carries a gear 134 which is driven by a gear 135 carried by the shaft 136 upon which the cam 45 is mounted. The Geneva gear driven member 131 is keyed to the shaft 32. The part 136 which is secured by screws 137 to the plate 132 is the usual Geneva gear locking member which cooperates with a cylindrical recess 138 of the Geneva gear driven member 131.

To use the machine, the machine is usually placed in a horizontal position so that its table 31 will rotate in a horizontal plane, the operator preferably located opposite the view of the machine shown in Fig. 4 or below the machine as viewed in Fig. 1, the armatures to be operated upon are preferably loaded into the machine at the location A of the work holder and are removed preferably at location B, the conveyor table 31 rotating in a counterclockwise direction as already explained. Since the operation of moving the work relative to the loading and unloading locations or stations, the indexing of the core into various positions and the shearing of the sheet insulation at the edges of the core are performed automatically by this machine, it is evident that the cost of this operation and the manufacture of an armature has been considerably reduced. The machine is capable of performing each cycle of operation while the operator is busy reaching for a new piece of work to be loaded at station A and while he is removing the finished work at station B from the table 31 and places it in a suitable container.

While the form of embodiment of the present invention as herein disclosed, constitutes a preferred form, it is to be understood that other forms might be adopted, all coming within the scope of the claims which follow.

What is claimed is as follows:

1. A machine for removing surplus insulation from the armatures of dynamo electric machines, comprising in combination, means for holding an armature having a slotted core, the peripheries of the teeth and the core slots being lined with sheet insulation, reciprocating means cooperating with the adjacent teeth of the slot for shearing the sheet insulation at adjacent edges of the teeth, and automatic means for intermittently moving the armature core in order to bring its core teeth successively into position so that the shearing means may operate successively upon the sheet insulation between adjacent core teeth.

2. A machine for removing surplus insulation from the armatures of dynamo electric machines, comprising in combination, a work holder for rotatably supporting an armature having a slotted core, the peripheries of the teeth and core slots being lined with sheet insulation, a reciprocating shear bar movable into a core slot and cooperating with the adjacent teeth of the slot in order to sever the insulation at adjacent edges of the teeth, means for moving the shear bar into and out of the core slot, and means for rotating the core, while the bar is withdrawn from the core, in order to bring its core teeth successively into position so that the shearing means may operate successively upon the sheet insulation between adjacent core teeth.

3. A machine for removing surplus insulation from the armatures of dynamo electric machines, comprising in combination, means for holding an armature having a slotted core, the peripheries of the teeth and the core slots being lined with sheet insulation, means cooperating with the adjacent teeth of a core slot for shearing the sheet insulation at adjacent edges of the teeth, a ratchet pawl cooperating with the core teeth for moving the core in order to bring its core teeth successively into position so that the shearing means may operate successively upon the sheet insulation between adjacent core teeth, and means for effecting, in succession, the operation of the shearing means and the operation of the pawl to move the core.

4. A machine for removing surplus insulation from the armatures of dynamo electric machines, comprising in combination, a work holder for rotatably supporting an armature having a slotted core, the peripheries of the teeth and core slots being lined with sheet insulation, a reciprocating shear bar movable into a core slot and cooperating with the edges of the adjacent teeth to sever the insulation at the edges of the teeth, a ratchet pawl cooperating with the core teeth for moving the core in order to bring its core teeth successively into position so that the shearing means may operate successively upon the sheet insulation between adjacent core teeth, and means for effecting, in succession, the operation of the shear bar and the operation of the pawl to move the core.

5. A machine for removing surplus insulation from the armatures of dynamo electric machines, comprising, in combination, a plurality of devices for holding an armature having a slotted core, the peripheries of the teeth and core slots being lined with sheet insulation, means for shearing the sheet insulation at adjacent edges of adjacent core teeth, means for automatically moving the armature core in order to bring its core teeth successively into position so that the shearing means may operate successively upon the sheet insulation between adjacent core teeth, and means for automatically moving the work holders successively toward and away from the shearing means after all of the surplus insulation has been severed from the core lining insulation.

6. A machine for removing surplus insulation from the armatures of dynamo electric machines, comprising, in combination, a plurality of work holders each for rotatably supporting an armature having a slotted core, the peripheries of the teeth and core slots being lined with sheet insulation, means for shearing the sheet insulation at adjacent edges of adjacent core teeth, a ratchet pawl adapted to engage the teeth of that armature core which is adjacent the shearing means, means for successively effecting the operation of the shearing means and the movement of the core by said pawl in order to bring the teeth of the core into position so that the shearing means may operate successively upon the sheet insulation between adjacent core teeth, and means for automatically moving the work holders successively toward and away from the shearing means after all of the surplus insulation has been severed from the core lining insulation.

7. A machine for removing surplus insulation from the armatures of dynamo electric machines, comprising in combination, a turn-table having a plurality of devices each adapted to support rotatably a slotted armature core having its teeth and core slots lined with sheet insulation, means for intermittently rotating the turn-table, a ratchet pawl supported for cooperation with the teeth of each core as it is located by the turn-table adjacent to the pawl, the pawl being so supported as to permit movement of a core away from the ratchet, a shear bar movable between adjacent core teeth and cooperating with adjacent edges of adjacent core teeth to shear the sheet insulation, and mechanism for successively causing, during a period of rest of the turn-table, the operation of the shear bar to shear the insulation and the operation the pawl to turn the core so that its slots will be successively aligned with the shear bar.

8. A machine for removing surplus insulation from the armatures of dynamo electric machines, comprising in combination, a plurality of devices for holding an armature having a slotted core, the peripheries of the teeth and core slots being lined with sheet insulation, means for shearing the sheet insulation at adjacent edges of adjacent core teeth, and means for automatically moving the work holders intermittently and successively adjacent to the shearing means and for causing the shearing means to operate upon all of the teeth of the core during a rest period of the work holders.

9. A machine for removing surplus insulation from the armatures of dynamo electric machines, comprising, in combination, a plurality of devices each for holding an armature having a slotted core, the peripheries of the teeth and core slots being lined with sheet insulation, means for shearing and bending the sheet insulation at adjacent edges of adjacent core teeth, means for automatically moving the armature core in order to bring its core teeth into position so that the shearing means may operate successively upon the sheet insulation between adjacent core teeth, means for locking the armatures during the operation of the shearing means upon the insulation, means for automatically moving the work holders successively toward and away from the shearing means after all the surplus insulation has been severed from the core, and means for locking the work holders during the operation of the shearing means upon all the surplus insulation of the core.

10. In a device of the class described, the combination of a tool for operating upon an armature core with means for feeding said armature core comprising, a plurality of devices for holding the armature core, automatic means for intermittently rotating the armature core in order to bring successive portions of the core into position to be operated upon by the tool, and means for automatically moving the work holders successively toward and away from the tool.

In testimony whereof I hereto affix my signature.

RUSSELL W. BAKER.